United States Patent
Yanagihara et al.

(10) Patent No.: US 6,370,517 B2
(45) Date of Patent: *Apr. 9, 2002

(54) ELECTRONIC MONEY CARD, ELECTRONIC MONEY RECEIVING/PAYING MACHINE, AND ELECTRONIC MONEY CARD EDITING DEVICE

(75) Inventors: Yasushi Yanagihara; Chie Hayami, both of Owariasahi (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,455

(22) Filed: May 5, 1998

(30) Foreign Application Priority Data

May 13, 1997 (JP) .............................................. 9-122514

(51) Int. Cl.[7] .............................................. G06F 17/00
(52) U.S. Cl. ........................................... 705/41; 705/40
(58) Field of Search ............................... 705/40, 41, 42, 705/43, 44; 235/379, 380

(56) References Cited

U.S. PATENT DOCUMENTS

| | | | | |
|---|---|---|---|---|
| 3,970,992 A | * | 7/1976 | Boothroyd et al. ........... | 705/43 |
| 3,996,450 A | * | 12/1976 | Kerkhoff ..................... | 235/380 |
| 4,361,757 A | * | 11/1982 | Ehrat ........................ | 235/487 |
| 4,476,468 A | * | 10/1984 | Goldman ............... | 340/825.34 |
| 4,736,094 A | * | 4/1988 | Yoshida ....................... | 235/379 |
| 4,802,218 A | * | 1/1989 | Wright et al. ................. | 705/60 |
| 4,900,903 A | * | 2/1990 | Wright et al. ............... | 235/380 |
| 4,968,873 A | * | 11/1990 | Dethloff et al. ............. | 235/380 |
| 4,983,816 A | | 1/1991 | Iijima | |
| 5,191,193 A | * | 3/1993 | Le Roux ..................... | 235/379 |
| 5,293,424 A | * | 3/1994 | Holtey et al. ................. | 380/23 |
| 5,310,999 A | * | 5/1994 | Claus et al. ................. | 235/384 |
| 5,401,950 A | | 3/1995 | Yoshida | |
| 5,461,217 A | | 10/1995 | Claus | |
| 5,578,808 A | * | 11/1996 | Taylor ........................ | 235/380 |
| 5,649,118 A | * | 7/1997 | Carlisle et al. ............... | 705/41 |
| 5,793,027 A | * | 8/1998 | Baik ........................... | 235/380 |
| 5,794,214 A | * | 8/1998 | Ebina et al. .................. | 705/24 |
| 5,895,452 A | * | 4/1999 | Lum ........................... | 705/16 |
| 5,905,245 A | * | 5/1999 | Tanaka ........................ | 235/375 |
| 5,952,639 A | * | 9/1999 | Ohki et al. .................. | 235/379 |
| 6,019,283 A | * | 2/2000 | Lucero ....................... | 235/380 |

FOREIGN PATENT DOCUMENTS

| | | |
|---|---|---|
| EP | 0 644 513 | 3/1995 |
| JP | 2000207509 A * | 7/2000 |
| WO | WO9015382 | 12/1990 |

OTHER PUBLICATIONS

Hitachi, Joho, Derwent–ACC–NO. 1999–292908, Apr. 1999.*

V.M. Cordonnier, "Smart cards: present and future application and techniques", Electronic & communication Engineering Journal, Oct. 1991.*

"http://drlink.mnis.net", Motorola: Motorola Smartcard System Business–Technology background web page, page 1–6.*

"http://www.linuxnet.com/information.html", M.U.S.C.L.E. web page, pp. 1–2.*

"http://www.amazon.com", Smart cards book review web page, p. 1–2.*

Mickey Meece, Drexler Sells Its LaserCard to Eastern Europe Institution, American Banker, p. 3, 7–10, Dec. 7, 1919.*

* cited by examiner

Primary Examiner—James P. Trammell
Assistant Examiner—Pierre E. Elisca
(74) Attorney, Agent, or Firm—Mattingly, Stanger & Malur, P.C.

(57) ABSTRACT

An electronic money card includes a memory built in an IC chip of an IC card and reads and writes electronic money to and from the memory. The electronic money card allows conditions restricting an electronic money reading process to be written in a storage area excluding an electronic money storage area set for each user or usage of the electronic money.

26 Claims, 6 Drawing Sheets

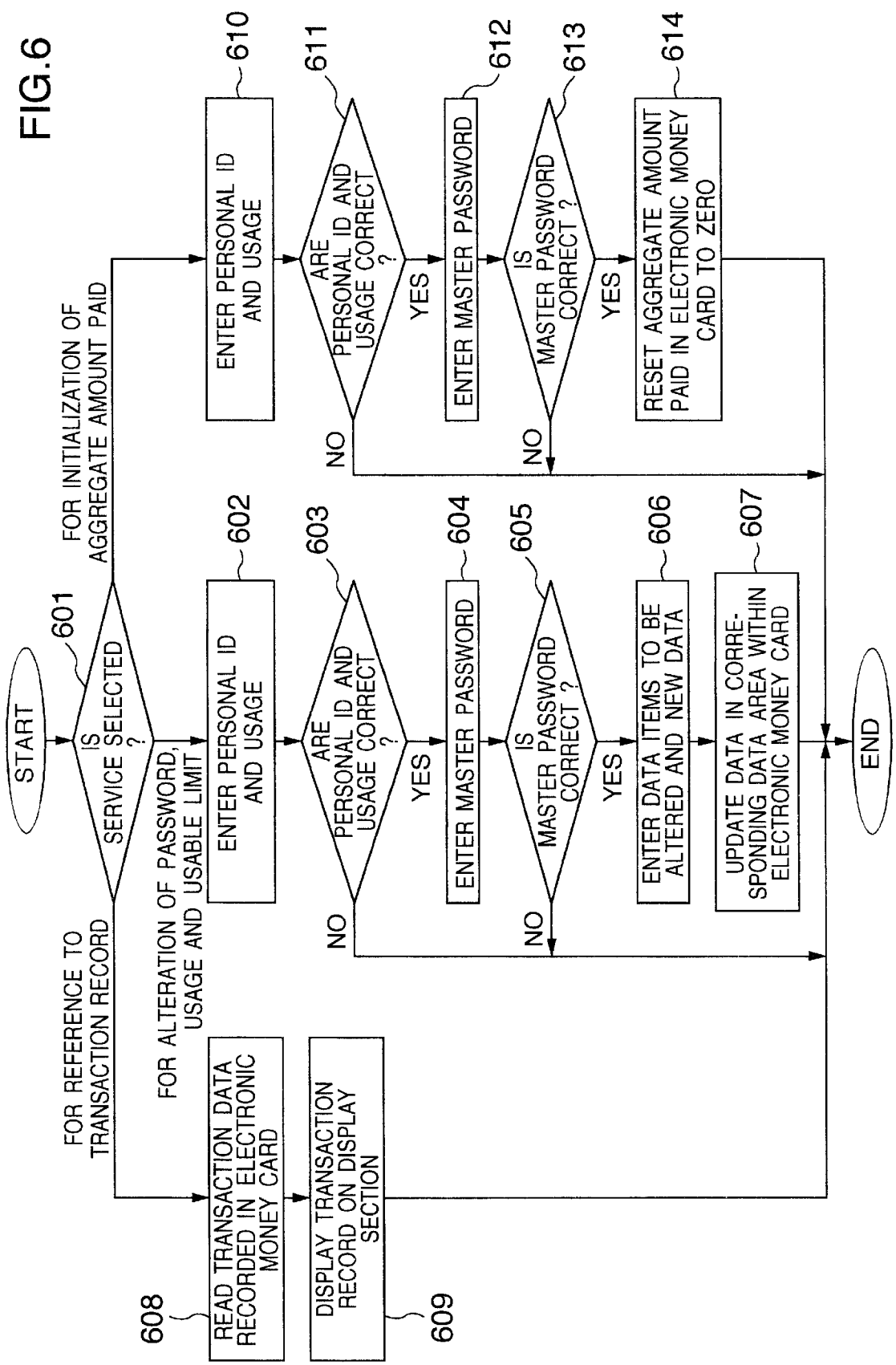

ELECTRONIC MONEY CARD, ELECTRONIC MONEY RECEIVING/PAYING MACHINE, AND ELECTRONIC MONEY CARD EDITING DEVICE

BACKGROUND OF THE INVENTION

The present invention relates to an electronic money card for dealing with money electronically, an electronic money receiving/paying machine for reading and writing electronic money from and to the electronic money card, and an electronic money card editing device for allowing a user, e.g, to refer to information stored in the electronic money card.

An electronic money card has a recording of money in the form of electronic cash in a memory built in an IC chip of an IC card. When a user stores electronic money in a recording area of a memory or withdraws the electronic money from the recording area, a certification number specific to the IC card or a password the user has for his account in a banking organ is used as a condition for payment with the card.

However, the aforementioned electronic money card certifies the user with a single password, and under this procedure, any user who knows the password can withdraw the total amount of electronic money stored in the electronic money card at once. Thus, when the user lends his electronic money card to or shares it with other people, the users must use the electronic money within the portions of a usable limit they mutually agreed upon, respectively. In addition, it is necessary to prepare a management ledger such as an account book to keep a record of used electronic money data.

SUMMARY OF THE INVENTION

The object of the present invention is to provide an electronic money card capable of storing usable limits of electronic money and passwords on a user or a usage basis and storing a transaction record including items indicating users and usages, an electronic money receiving/paying machine capable of receiving and paying electronic money to and from the electronic money card, and an electronic money card editing device allowing a user to refer to the transaction record stored in the electronic money card and to alter identifiers, usable limits of electronic money and passwords set on a usage basis.

To achieve the above object, the present invention provides an electronic money card, in which a storage section of the card has an area for storing a restricting condition for the withdrawal of electronic money and in which a logic is provided so that a user is allowed to read or write the electronic money stored in the electronic money card based on such condition.

The present invention further provides an electronic money receiving/paying machine that allows a user to receive or pay electronic money based on a restricting condition set in an electronic money card when the machine performs a receiving and paying process with the electronic money card in accordance with a message displayed on a display section of the machine.

The present invention still provides an electronic money card editing device that allows a user to refer to a transaction record in the electronic money card and to alter passwords, usages and usable limits in accordance with a message displayed on a display section of the device.

BRIEF DESCRIPTION OF THE DRAWINGS

FIG. 6 is an exemplary flowchart showing a process provided by a transaction application program of the electronic money card editing device.

DESCRIPTION OF THE PREFERRED EMBODIMENTS

Embodiments of the present invention will now be described with reference to the drawings.

Figure 1:
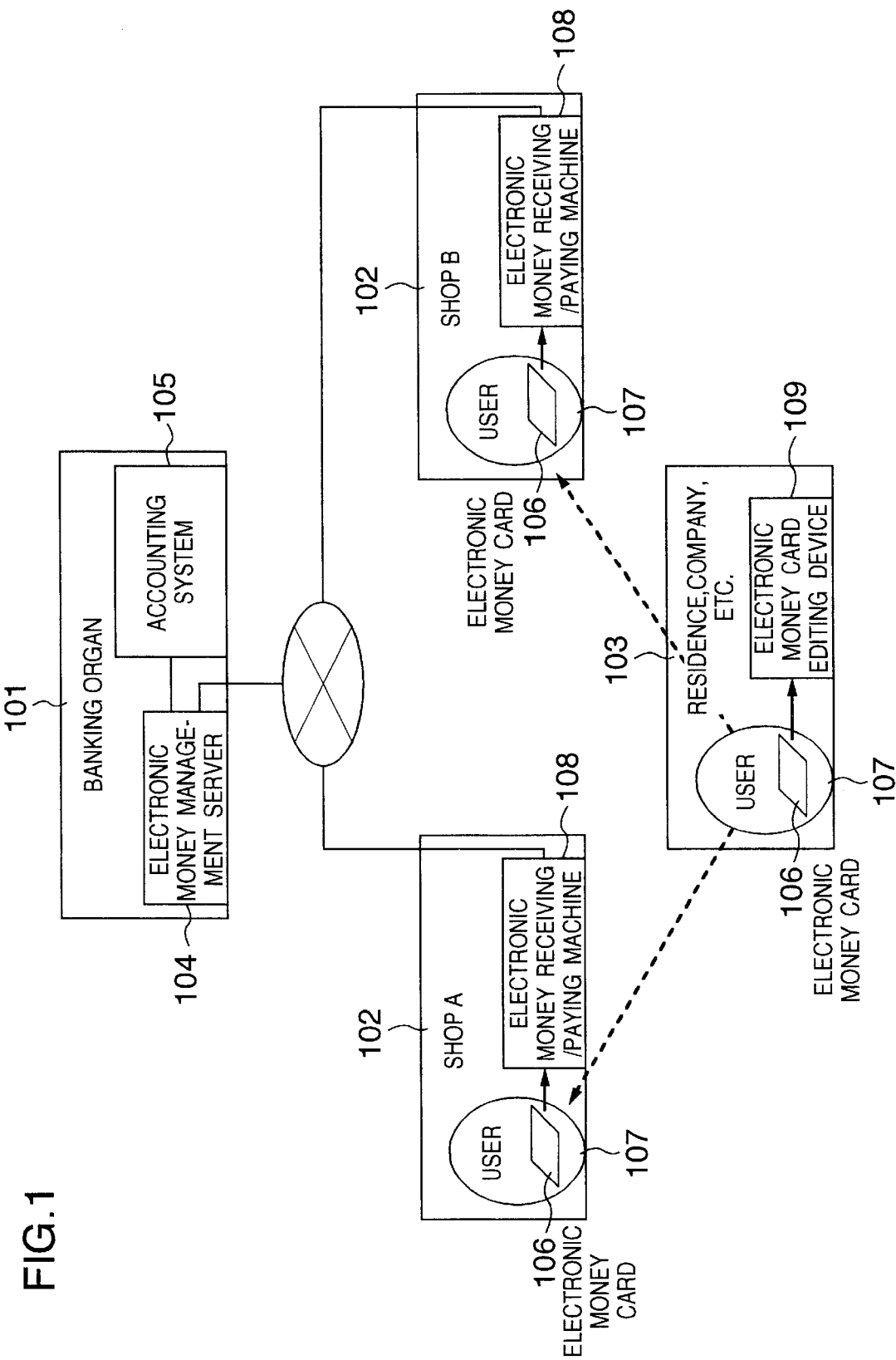
FIG. 1 is a diagram showing an exemplary organization of an electronic money system using an electronic money card, an electronic money receiving/paying machine and an electronic money card editing device.

FIG. 1 is an exemplary organization of an electronic money system using an electronic money card, an electronic money receiving/paying machine using the electronic money card, and an electronic money card editing device for editing conditions and the like which are set for using the electronic money card.

When a user 107 uses an electronic money card 106 in order to pay the price for a service received at a shop 102 (among a plurality of shops A, B and so on), the user 107 inserts the electronic money card 106 into an electronic money receiving/paying machine 108 installed at the shop 102 to read electronic money stored in the card 106. The electronic money receiving/paying machine 108 then writes the read electronic money into a shop's electronic money card (not shown) that has already been inserted into the machine 108. A transaction is established between the user 107 and the shop 102 in this way.

Further, when the shop 102 deposits the electronic money accumulated in the shop's electronic money card to an account the shop 102 has with a banking organ 101, the electronic money receiving/paying machine 108 reads the electronic money stored in the shop's electronic money card and transmits the read electronic money to an electronic money management server 104 installed at the banking organ 101. The electronic money management server 104 requests an accounting system 105 installed at the banking organ 101 to follow a procedure for depositing an amount of money equivalent to the received electronic money into the account of the shop 102. When the accounting system 105 completes the depositing procedure, the electronic money receiving process is complete.

Figure 2:
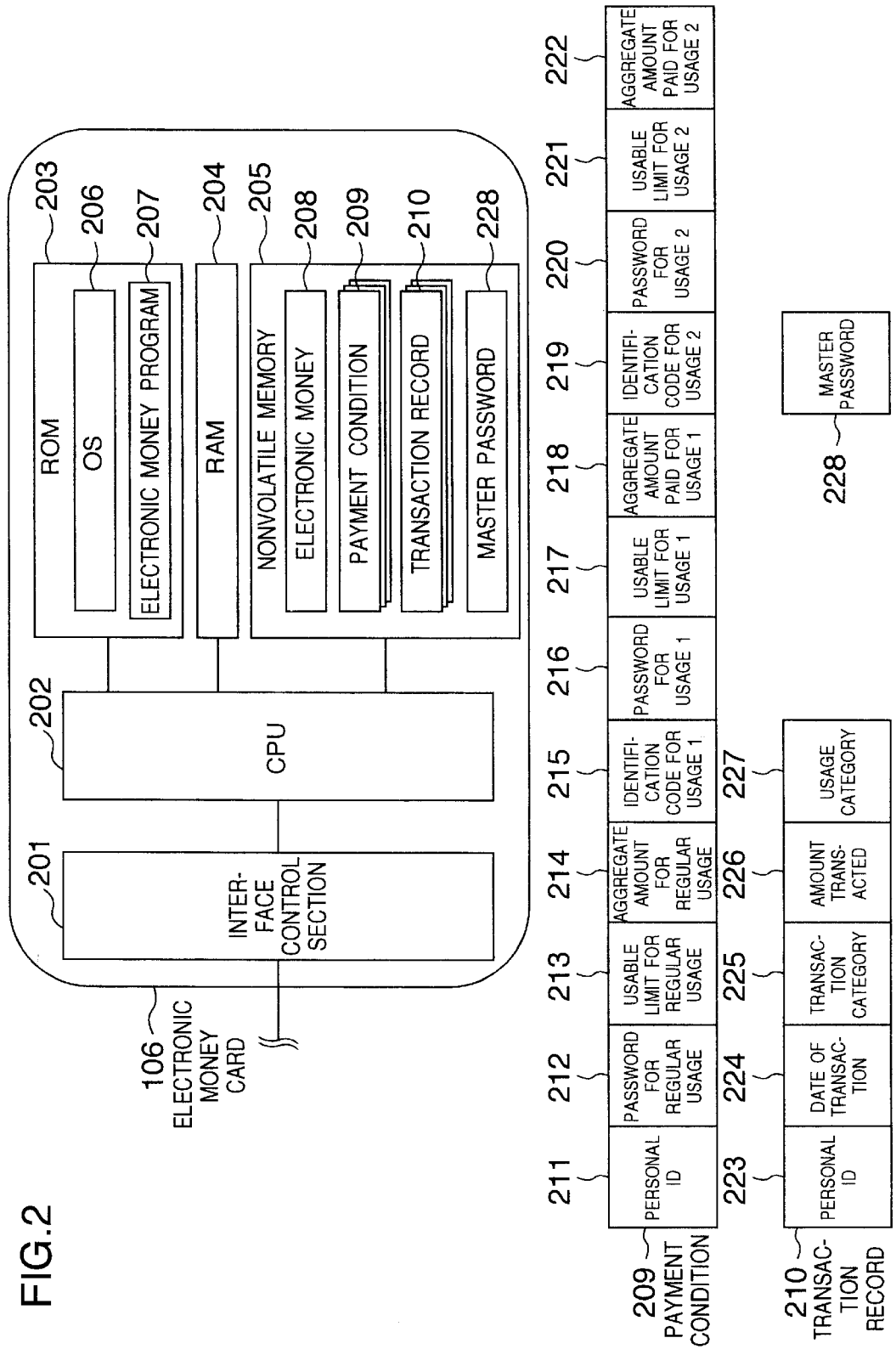
FIG. 2 is a diagram showing an exemplary structure of an electronic money card for storing electronic money.

FIG. 2 is a diagram showing a configuration of the electronic money card 106 shown in FIG. 1. When the electronic money card 106 is inserted into the electronic money receiving/paying machine 108 or an electronic money card editing device 109 (hereinafter referred to as the "control unit"), the electronic money card 106 is activated in response to an electronic signal supplied through an interface control section 201. With the electronic money card 106 activated, an OS (operating system) 206 and an electronic money program 207 that are stored in a ROM 203 are loaded to a RAM 204. As a result, a CPU 202 is allowed to read and write the data in the RAM 204 and a nonvolatile memory 205 in accordance with a command from the control unit received through the interface control section 201. For example, when a command for withdrawing or storing electronic money 208 is received from the interface control section 201, the CPU 202 rewrites data of the electronic money 208 recorded in the nonvolatile memory 205 in accordance with a logic described in the electronic money program 207.

The nonvolatile memory 205 has a storage area 209 (hereinafter referred to as the "payment condition 209") for recording a personal ID 211 set on a user basis, usage identification codes 215 and 219, passwords 212, 216 and 220 set on a usage basis, usable limits 213, 217 and 221, and aggregate amounts 214, 218 and 222. The usage identification code indicates what purpose a user uses the electronic money card 106 for. The usable limit indicates the maximum limit of electronic money the user can withdraw. The aggregate amount indicates a total sum of electronic money read from the electronic money card. Further, the electronic money program 207 has logics that allow the user to perform processes such as withdrawing electronic money and editing the electronic money card using the payment condition 209 and a master password 228 as permitting conditions. That is, one of the logics requires the payment condition 209 as permission to allow the user to read the electronic money, and the other logic requires the master password 228 as permission to allow the user to rewrite the payment condition 209.

Further, the nonvolatile memory 205 additionally includes a storage area 210 (hereinafter referred to as the "transaction record 210") for recording a user's personal ID 223, a transaction date 224, a transaction category 225, an amount transacted 226, and a usage category 227. The transaction date 224 indicates the year, month and day in which the electronic money is read and written. The transaction category 225 indicates the reading or writing of electronic money. The amount transacted 226 indicates a volume of electronic money read or written. The usage category 227 indicates the purpose for which the electronic money is used. The nonvolatile memory 205 stores a record of electronic money and the like therein in accordance with a logic given to the electronic money program 207. That is, the logic causes the program 207 to record transaction data in the transaction record 210 after the program 207 has read or written the electronic money.

As described above, the condition of usable limit is defined for each usage in the electronic money card. Therefore, even if there is a positive balance in the user's electronic money account, the user is prohibited from performing a payment process, such as in purchasing an article, using the electronic money 208 exceeding the usable limit. Hence, even if a third party happens to know a password corresponding to a usage, such third party, not knowing passwords corresponding to other usages, can use the electronic money for only one usage, and this means that the damage suffered by the user could be minimized with only a minimum amount of money illegally used by the third party. In other words, the electronic money card of the present invention provides the advantage of minimizing illegal use of electronic money.

Figure 3:
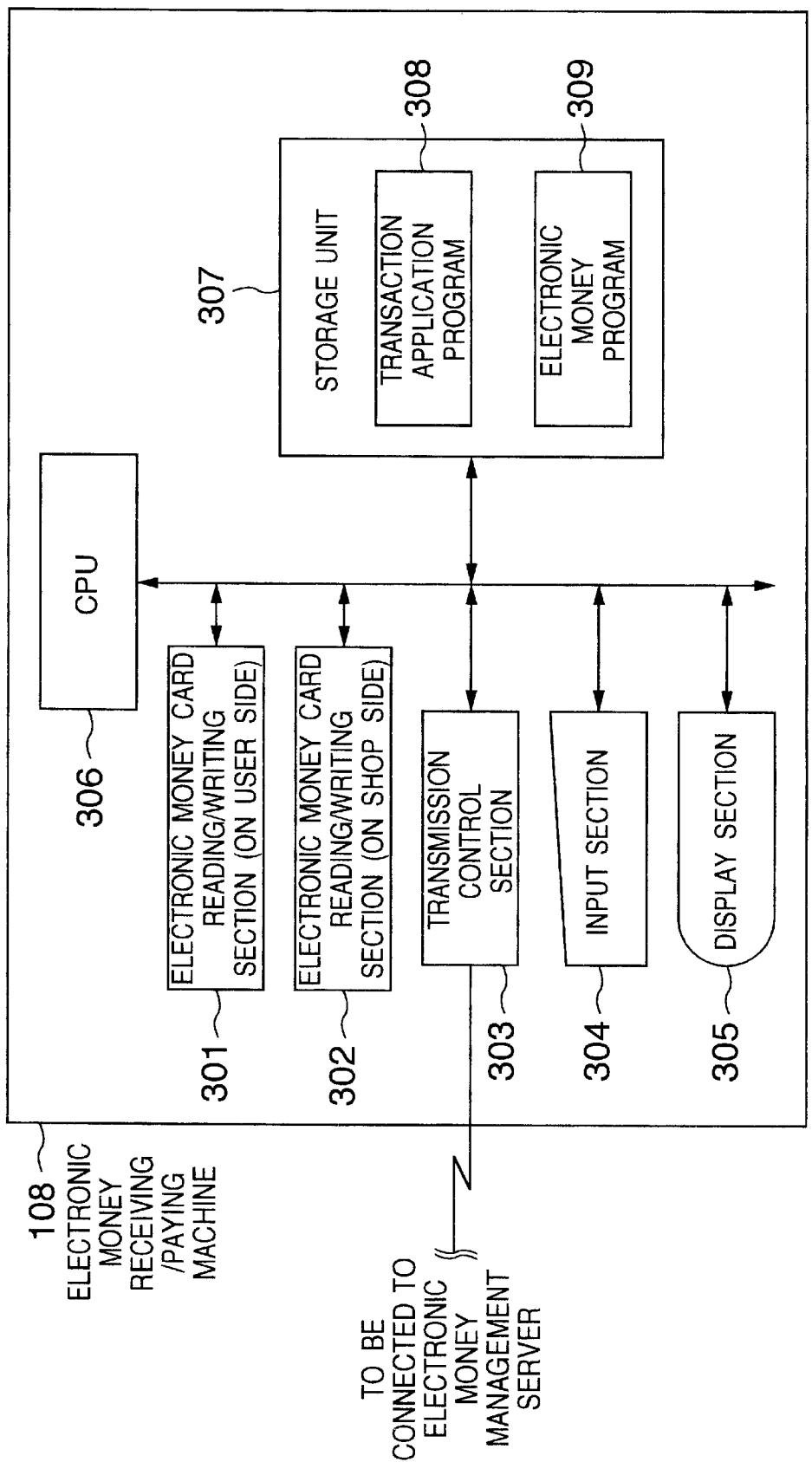
FIG. 3 is a diagram showing an exemplary configuration of an electronic money receiving/paying machine installed in a shop for performing the receiving and paying operation with respect to the electronic money card.

FIG. 3 shows an exemplary configuration of the electronic money receiving/paying machine 108 shown in FIG. 1.

A process for receiving or paying electronic money involves the step of transferring the electronic money from the electronic money card 106 possessed by the user 107 to the electronic money card possessed by the shop 102 or vice versa. First, a transaction application program 308 that controls electronic money receiving and paying transactions displays on a display section 305 an instruction prompting the user 107 to insert the user's electronic money card 106 into an electronic money card reading/writing section 301 on the user side and an instruction prompting the shop 102 to insert the shop's electronic money card into an electronic money card reading/writing section 302 on the shop side. After the user 107 and the shop 102 finish inserting their electronic money cards, the transaction application program 308 displays on the display section 305 an instruction prompting the user 107 to enter a group of data which includes an amount of money equivalent to a service the user received from the shop, a password certifying that the user 107 is a legitimate user of the electronic money card 106, a personal ID identifying the user 107 and an identification code specifying a usage of the electronic money. As a result, the program 308 receives such group of data from the user 107 via an input section 304. Then, the transaction application program 308 gives an electronic money program 309 a command and the group of data received from the input section 304. The command causes the program 309 to transfer electronic money equivalent to the amount of money received from the input section 304 from the user's electronic money card 106 to the shop's electronic money card. Successively, in response to the command from the transaction application program 308, the electronic money program 309 transfers the electronic money to the shop's electronic money card from the user's electronic money card 106. The group of data transferred at this time is delivered to the electronic money program 207 stored in the user's electronic money card 106 and used as permission to perform the electronic money payment process described with reference to FIG. 2, i.e., as the condition set by the usage identification code 215, the password 216 and the like.

In a process through which the shop deposits the electronic money stored in the shop's electronic money card in an account the shop 102 has with the banking organ 101, the transaction application program 308 gives the electronic money program 309 a command for withdrawing the electronic money from the shop's electronic money card, and the electronic money program 309 transfers the withdrawn electronic money to the electronic money management server 104 from a communication control section 303.

Figure 4:
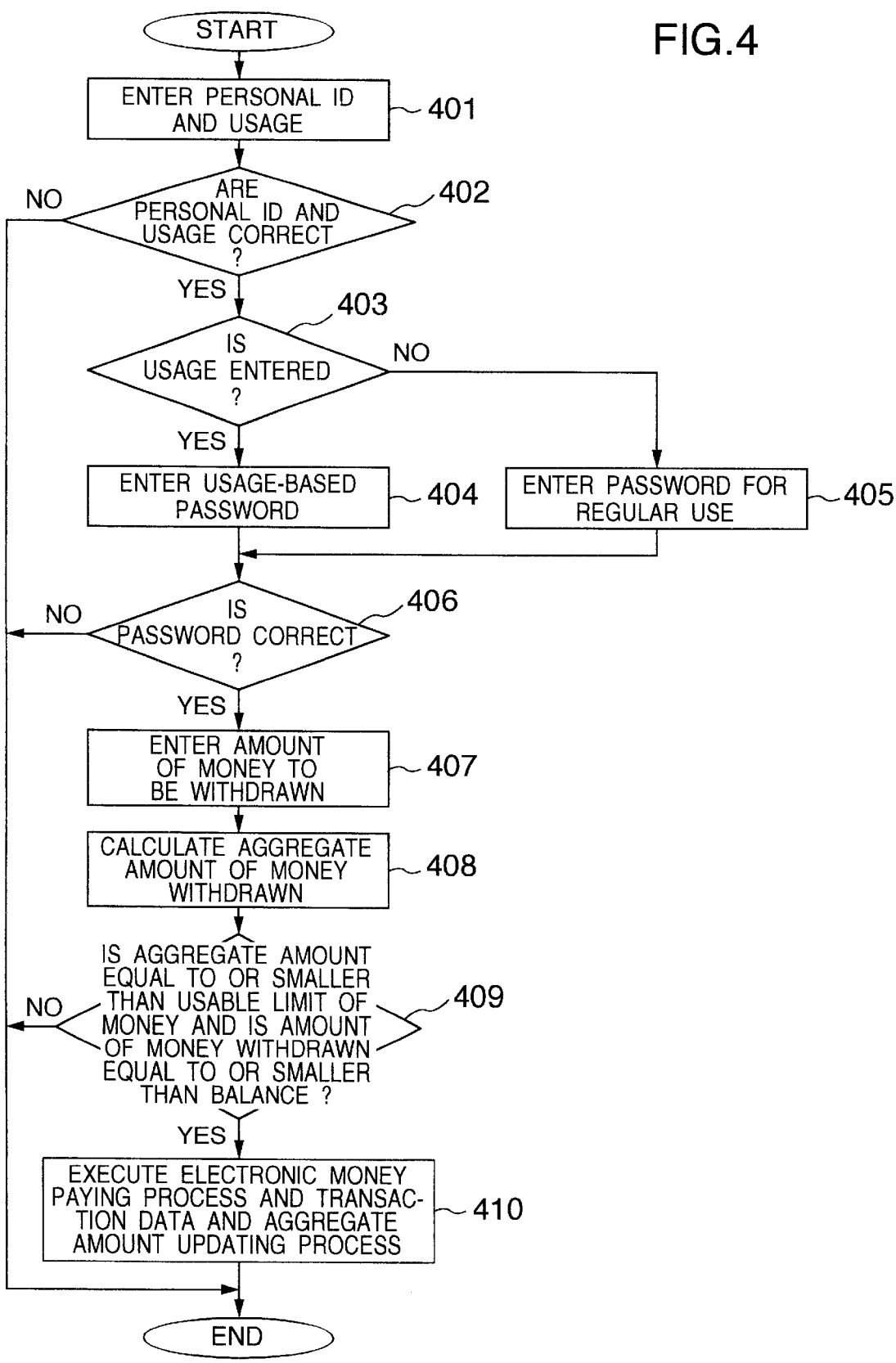
FIG. 4 is an exemplary flowchart showing an electronic money transaction provided by a transaction application program of the electronic money receiving/paying machine.

FIG. 4 is a flowchart showing an exemplary electronic money payment transaction provided by the transaction application program 308 of the electronic money receiving/paying machine 108. A CPU 306 controls the transaction.

First, the user 107 enters a personal ID that identifies the user 107 and a usage of electronic money from the input section 304 (Step 401). The transaction application program 308 checks the validity of the entered data (Step 402). The checking process is performed when the electronic money program 309 of the electronic money receiving/paying machine 108 gives the electronic money program 207 of the electronic money card 106 an instruction for checking the entered data. On the other hand, the electronic money program 207 of the electronic money card 106 determines the validity of the received input data by comparing such received input data with the personal ID 211 and the usage-based identification codes 215 and 219 which are defined as the payment condition 209 in the nonvolatile memory 205.

Next, the program 308 asks the input section 304 of the electronic money receiving/paying machine 108 if the user has entered the usage (Step 403). If the answer is affirmative, the program 308 prompts the user to enter a usage-based password (Step 404), whereas if the answer is negative, the program 308 prompts the user to enter a regular password (Step 405). Then, the validity of the entered password is checked in accordance with the type of password, either usage-based or regular (Step 406). The electronic money program 207 of the electronic money card 106 makes the validity check by comparing the entered password with the passwords 212, 216 and 220 defined as the payment condition 209.

If the entered password is found to be correct, an amount of electronic money 208 withdrawable from the electronic money card 106 within the usable limit 213, 217 or 221 corresponding to the entered usage is obtained (Step 407). Then, the amount of money withdrawn is added to the aggregate amount of electronic money so far paid 214, 218 or 222 (Step 408), and the obtained sum is compared with both the electronic money balance and the usable limit 213, 217 or 221 in the electronic money card (Step 409). If the sum is equal to or smaller than the balance and the usable limit 213, 217 or 221, the user is permitted to make payment in electronic money, so that the electronic money is withdrawn, and the payment transaction is terminated after a recording of transaction data is made (Step 410). The transaction data includes the personal ID 223, the date 224 in which the transaction is performed, the transaction category 225 that specifies the type of transaction, either receipt or payment, the amount of money transacted 226, and the usage category 227 that indicates identification codes defined on a usage basis. When such transaction data is written into the transaction record 210 of the electronic money card 106, a payment transaction is terminated.

The comparison process in Step 409 will be described more specifically. That is, the following describes in more detail the process of comparing the amount of money withdrawn to be added (or the amount of money to be paid which is to be added to the aggregate amount of electronic money paid shown in FIG. 2) with the electronic money balance in the electronic money card 106 and the usable limit 213, 217 or 221 defined as the payment condition 209. The usable limit means the maximum limit of electronic money set for each usage as described above. For example, if a user withdraws electronic money many times, the amount of money withdrawn is added up every time the withdrawing operation is performed. That is, under this procedure, the user is required to receive and pay the electronic money within a usable limit. Thus, not only the amounts of money withdrawn by the user is compared with the usable limit, but also the sum of the amount of money currently withdrawn and the aggregate amount of money so far paid is compared with the usable limit. On the other hand, in case the electronic money balance is insufficient, the amount of money to be added is compared with the current electronic money balance so that the user can perform transactions within the electronic money currently available as the balance. Thus, whether the user can withdraw the electronic money from his electronic money card or not is determined by making these comparisons.

Further, the steps described with reference to FIG. 4 are not necessarily taken in the order they are mentioned. For example, the object of the present invention can be achieved by executing the usage-related steps (Steps 401 to 403) after checking the balance in the electronic money card (Step 409). The same applies to the flow of steps shown in FIG. 6.

Figure 5:
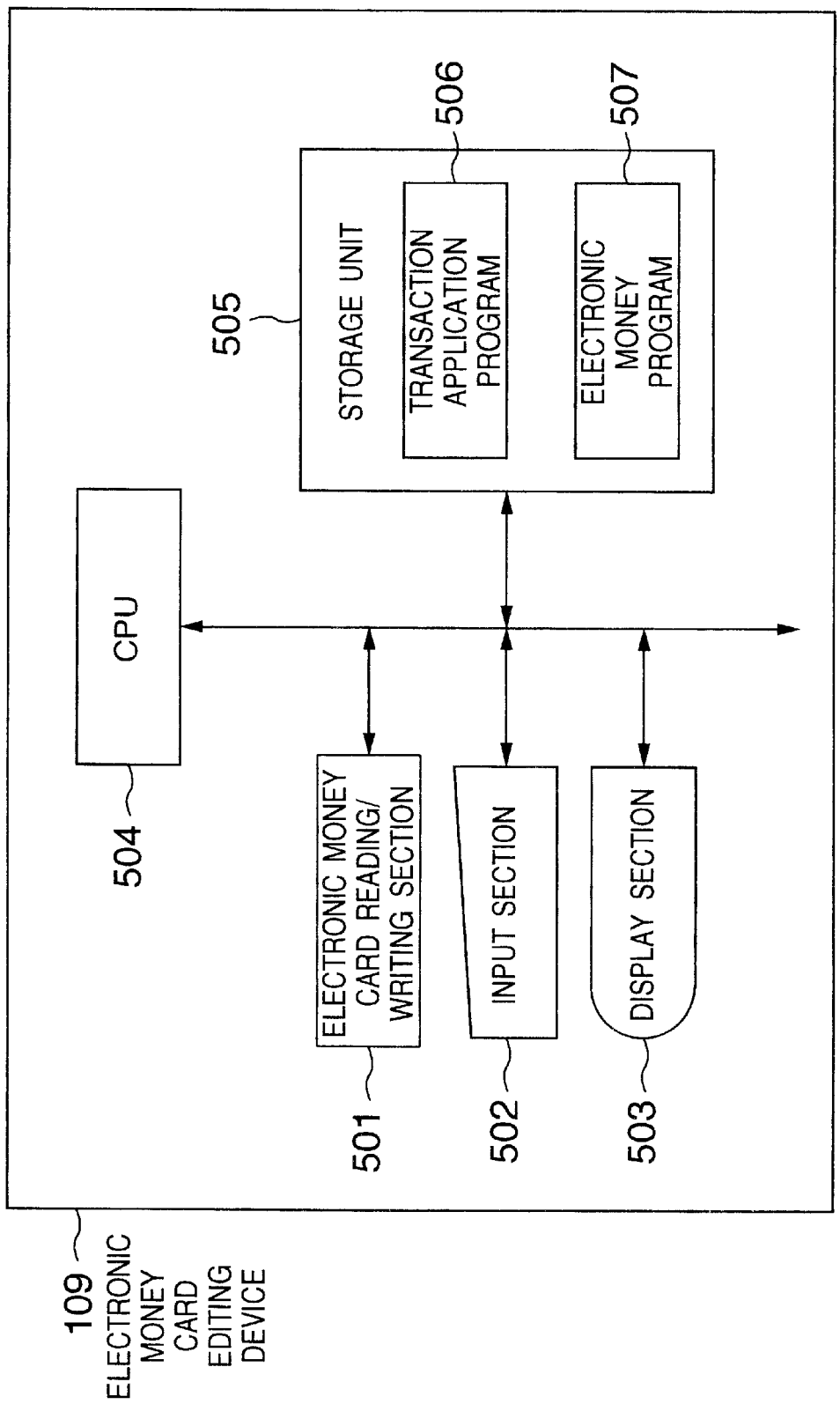
FIG. 5 is a diagram showing an exemplary configuration of an electronic money card editing device which is possessed by a user and allows the user to refer to a transaction record stored in the electronic money card and by which the user can update a payment condition.

FIG. 5 is a diagram showing a configuration of the electronic money card editing device 109.

A transaction application program 506 of the electronic money card editing device 109 provides a reference service and two types of rewriting services. The reference service allows a user to refer to the transaction record 210 stored in the electronic money card 106. One of the rewriting services allows the user to rewrite the passwords 212, 216 and 220 set on a usage basis, and the usage identification codes 215 and 219 and usable limits 213, 217 and 221 recorded in the electronic money card 106. The other rewriting service allows the user to reset to zero the aggregate amounts of electronic money paid 214, 218 and 222 recorded in the electronic money card 106 on a user and a usage basis. An electronic money program 507 executes a process for reading and writing the payment condition 209 recorded in the electronic money card 106 and a process for reading the transaction record 210 stored in the card 106. The user 107 inserts the electronic money card 106 to an electronic money card reading section 501 and enters data necessary for receiving desired services from an input section 502 in accordance with instructions displayed on a display section 503.

FIG. 6 is a flowchart showing how the services are provided by the transaction application program 506 of the electronic money card editing device 109. A CPU 504 mainly controls the following processes.

First, the transaction application program 506 of the electronic money card editing device 109 displays on the display section 503 a message instructing the user 107 to select a service (Step 601).

If the service for referring to the transaction record is selected from the input section 502, the process for reading the transaction record is executed (Step 608). The transaction record is read when the electronic money program 507 applies to the electronic money program 207 stored in the electronic money card 106 a command for reading the transaction record 210 stored in the nonvolatile memory 205. In response to the command, the electronic money program 207 of the electronic money card 106 reads a data table of the transaction record 210 and delivers the read data table to the transaction application program 506 through the electronic money program 507. Then, the data table of the transaction record 210 is displayed on the display section 503 (Step 609).

On the other hand, if the service for rewriting a password, a usage, and a usable limit of money is selected from the input section 502, the user is requested to enter a personal ID and a usage (Step 602). The entered data are delivered to the electronic money program 207 of the electronic money card 106 and used to select items to be rewritten from a data table of the payment condition 209. Upon detection of the data that coincides with the entered data (Step 603), the user 107 is requested to enter a master password given to a manager of the electronic money card 106 (the manager is one of the users 107 who is authorized to rewrite the payment condition 209) (Step 604). This step is effective in prohibiting a current possessor of the electronic money card 106 from altering any part of the payment condition 209 specified by others when the electronic money card 106 is lent to or shared among a plurality of people. The entered password is compared with the master password 228 of the electronic money card 106 (Step 605). When both passwords coincide with each other, the user 107 is permitted to enter new data (updated data) (Step 606). Then, the entered new data is delivered to the electronic money program 207 so that the data is rewritten (Step 607). If the passwords do not coincide in Step 605, the user cannot alter data (various conditions) in the electronic money card 106.

On the other hand, when the user selects the service for resetting the aggregate amounts of money paid to zero, the user is requested to enter a usage, a password and the like as the user is so requested in the process described with respect to receiving the service for rewriting a password, a usage and a usable limit (Steps 610, 611, 612 and 613). When the rewriting of the payment condition 209 recorded in the nonvolatile memory 205 of the electronic money card 106 is permitted, the aggregate amounts of money paid 214, 218 and 222 are reset to zero (Step 614). The reason why the aggregate amounts of money paid in the electronic money card are reset to zero is to avoid the inconvenience of prohibiting a legitimate user from legally using the electronic money card. That is, the legitimate user is no longer permitted to use the electronic money card if his electronic money payments exceed the usable limits as each payment is accumulated in the aggregate amounts in the electronic money card.

The present invention will be described more specifically. Let us take an example in which a plurality of people share a single card in common: e.g., family members such as the farther, the mother, an elder brother, a younger sister share a card, and company staff members such as a general manger, a manager, employees share a card. In these cases, the card can be used flexibly by setting on an individual member basis such usage-based conditions as passwords and identification codes defined in the payment condition 209 which is described with reference to FIG. 2. In addition, the card allows each member user to set conditions on a usage basis, such as the purchasing of books, foods or clothes.

While the processes (described especially with reference to FIGS. 4 and 6) of the electronic money card, the electronic money receiving/paying machine and the electronic money card editing device are performed chiefly under the control of the CPUs respectively equipped with the electronic money receiving/paying machine and the electronic money card editing device, it goes without saying that the CPU arranged in the electronic money card can control these processes. It may be noted that each of these CPUs is termed a "control section."

According to the present invention, an electronic money card allows a plurality of users to record their individual usable limits and passwords of electronic money on a usage basis, and the electronic money card prohibits the use of the electronic money in amounts exceeding the usable limits unless the manager of the electronic money card who has the master password is asked to reset the aggregate amounts of electronic money paid to zero. As a result of the present invention, a single electronic money card can be shared in common among a plurality of people, and thus the invention contributes to the promotion of a planned use of the electronic money card among family members or in corporate organizations.

Furthermore, the electronic money stored in the electronic money card is managed on the basis of a plurality of usable limits and passwords. Therefore, even if a certain password is leaked to a third party, the advantage of improving safety is provided in the sense that the third party cannot withdraw all the electronic money available in the card at once.

What is claimed is:

1. An electronic money transaction apparatus for performing an electronic money transaction with an electronic money card for storing electronic money therein, comprising:

a CPU, an input section, and a display section, wherein the CPU causes the display section to display a message prompting a user to enter a usage of the electronic money card on the display section upon request for a transaction using the electronic money, and performs an electronic money transaction with the electronic money card based on the usage entered from the input section, and the CPU adds an amount of transacted electronic money to be withdrawn to an aggregate amount of the electronic money in the electronic money card as the aggregate amount, every time an electronic money transaction is performed with the electronic money card.

2. An electronic money transaction apparatus according to claim 1, wherein the CPU displays a message prompting a user to enter a password set in accordance with a usage on the display section and permits a transaction with the electronic money card when the password entered from the input section coincides with a password set in the electronic money card.

3. An electronic money transaction apparatus according to claim 1, wherein the CPU stops a transaction with the electronic money card when an amount of electronic money for payment to be entered from the input section is greater than an electronic money balance in the electronic money card.

4. An electronic money transaction apparatus according to claim 1, wherein the CPU stops a transaction with the electronic money card when an amount of electronic money for payment to be entered from the input section is greater than a usable limit set in the electronic money card.

5. An electronic money transaction apparatus according to claim 1, wherein the CPU stops a transaction with the electronic money card when a sum of an amount of electronic money for payment to be entered from the input section and the aggregate amount in the electronic money card is greater than an electronic money balance in the electronic money card.

6. An electronic money transaction apparatus according to claim 1, wherein the CPU stops a transaction with the electronic money card when a sum of an amount of electronic money for payment to be entered from the input section and the aggregate amount in the electronic money card is greater than a usable limit set in the electronic money card.

7. An electronic money transaction apparatus according to claim 1, wherein the CPU sums an amount of electronic money transacted in the electronic money card as an aggregate amount individually for each of plural users authorized to use the electronic money card, and wherein usage approval for the electronic money transaction is user-dependent, based upon the aggregate amount and an amount authorized for each user.

8. An electronic money transaction apparatus, comprising:

an electronic money card;

an input section into which the electronic money card for storing electronic money is inserted; and a CPU for causing a display to display a message prompting a user to enter a usage of the electronic money card upon request for a transaction using the electronic money, performing an electronic money transaction with the electronic money card based on the usage entered from the input section, and for summing an amount of electronic money transacted in the electronic money card as an aggregate amount every time an electronic money transaction is performed with the electronic money card;

wherein said electronic money card includes:
  a storage section for storing data of the electronic money, a plurality of pieces of identification data for identifying usage to be specified when the electronic money card is used, and usable limit data for limiting an amount of electronic money to be used in correspondence with each piece of identification data; and
  a control section for comparing a piece of identification data received from outside the electronic money card with each of the pieces of identification data stored in the storage section upon request for payment, and for permitting the payment in electronic money from the electronic money card within the usable limit of the electronic money limited by the piece of identification data when the compared pieces of identification data coincide with each other.

9. An electronic money transaction apparatus according to claim 8, wherein
  the storage section stores a password set to correspond to a piece of identification data, and
  the control section permits payment in electronic money when a password received from outside the electronic money card coincides with the password stored in the storage section.

10. An electronic money transaction apparatus according to claim 8, wherein
  the storage section stores an aggregate amount obtained by the control section adding up a total amount of electronic money paid every time the electronic money is paid.

11. An electronic money transaction apparatus according to claim 8, wherein
  the storage section stores a transaction record in which transaction data are recorded when the control section performs an electronic money transaction.

12. An electronic money transaction apparatus according to claim 8, wherein
  the control section updates the piece of identification data when instructed to update the piece of identification data stored in the storage section.

13. An electronic money transaction apparatus according to claim 12, wherein
  the storage section stores a master password for giving permission to alter data stored in the storage section, and
  the control section updates the piece of identification data when a password to be entered coincides with the master password.

14. An electronic money transaction apparatus for performing an electronic money transaction with an electronic money card for storing data of the electronic money, a plurality of pieces of identification data for identifying usage to be specified when the electronic money card is used, and usable limit data for limiting an amount of electronic money to be used in correspondence with each piece of identification data, comprising:
  a CPU, an input section, and a display section, wherein said display section displays said usage for entering the usage of an electronic money stored in said electronic money card;
  said input section decides whether or not an entry of the usage on said display section is present, the input section indicating an entry of a regular usage password to be regularly used for said electronic money card on said display section when the entry of said usage is not present, and indicating the entry of a password provided for each of said usages on said display section when the entry of said usage is present;
  said display section displays an input guidance for one of the regular usage password and the password provided for each of said usages in response to the indication from said input section;
  said CPU:
    decides a validity for the password provided for each of said usages among said plurality of pieces of identification data stored in said electronic money card in response to the entry of the password provided for each of said usages entered from said input section;
    decides a condition of a limited amount corresponding to said usage entered from said input section by the limited amount provided for each of said usages corresponding to said plurality of pieces of identification data stored in said electronic money card when the password is correct; and
    acquires a withdrawing amount of the electronic money for said corresponding usage stored in said electronic money card when the condition of the limited amount is present in a range of the limited amount provided for each of said usages.

15. An electronic money transaction apparatus according to claim 14, wherein
  the CPU stops a transaction with the electronic money card when an amount of electronic money for payment to be entered from the input section is greater than an electronic money balance in the electronic money card.

16. An electronic money transaction apparatus according to claim 14, wherein
  the CPU stops a transaction with the electronic money card when an amount of electronic money for payment to be entered from the input section is greater than a usable limit set in the electronic money card.

17. An electronic money transaction apparatus according to claim 14, wherein
  the CPU adds an amount of transacted electronic money to a stored aggregate amount of electronic money previously transacted for a predetermined one of the usages.

18. An electronic money transaction apparatus according to claim 17, wherein
  the CPU stops a transaction with the electronic money card when a sum of the amount of electronic money for payment to be entered from the input section for the predetermined usage and the stored aggregate amount of electronic money previously transacted for the predetermined usage is greater than an electronic money balance in the electronic money card.

19. An electronic money transaction apparatus according to claim 17, wherein
  the CPU stops a transaction with the electronic money card when a sum of the amount of electronic money for payment to be entered from the input section for the predetermined usage and the stored aggregate amount of electronic money previously transacted for the predetermined usage is greater than a usable limit set in the electronic money card for the predetermined usage.

20. An electronic money transaction apparatus for performing an electronic money transaction with an electronic money card for storing electronic money therein, comprising:

a CPU, an input section, and a display section, wherein the CPU causes the display section to display a message prompting a user to enter, via the input section, one of a plurality of prestored usages of the electronic money card on the display section upon request for a transaction using the electronic money, and performs an electronic money transaction with the electronic money card based on the usage entered by the user, and the CPU adds an amount of the transacted electronic money to a stored aggregate amount of electronic money previously transacted for the usage entered by the user.

21. An electronic money transaction apparatus according to claim 20, wherein the CPU displays a message prompting a user to enter, via the input section, a password set in accordance with the usage entered by the user, and permits a transaction with the electronic money card when the password entered by the user coincides with a password set in the electronic money card for the usage entered by the user.

22. An electronic money transaction apparatus according to claim 20, wherein the CPU stops a transaction with the electronic money card when an amount of electronic money for payment to be entered from the input section is greater than an electronic money balance in the electronic money card.

23. An electronic money transaction apparatus according to claim 20, wherein the CPU stops a transaction with the electronic money card when an amount of electronic money for payment to be entered from the input section is greater than a usable limit set in the electronic money card for the usage entered by the user.

24. An electronic money transaction apparatus according to claim 20, wherein the CPU stops a transaction with the electronic money card when a sum of the amount of the transacted electronic money and the stored aggregate amount of electronic money previously transacted for the usage entered by the user is greater than an electronic money balance in the electronic money card.

25. An electronic money transaction apparatus according to claim 20, wherein the CPU stops a transaction with the electronic money card when a sum of the amount of the transacted electronic money and the stored aggregate amount of electronic money previously transacted for the usage entered by the user is greater than a usable limit set in the electronic money card for the usage entered by the user.

26. An electronic money transaction apparatus according to claim 20, wherein the CPU sums an amount of electronic money transacted in the electronic money card as an aggregate amount individually for each of plural users authorized to use the electronic money card, and wherein usage approval for the electronic money transaction is user-dependent, based upon the aggregate amount and an amount authorized for each user.

* * * * *